INVENTORS:
A. BIJL
H. J NIHOF

United States Patent Office 3,454,886
Patented July 8, 1969

3,454,886
CONTROLLER WITH WIDELY VARIABLE
RESET TIME
Aart Bijl and Hendrikus J. Nihof, Amsterdam, Netherlands, assignors to Shell Oil Company, New York, N.Y., a corporation of Delaware
Filed May 8, 1967, Ser. No. 636,737
Claims priority, application Netherlands, May 24, 1966, 6607080
Int. Cl. H03f 1/02, 1/14
U.S. Cl. 330—9     3 Claims

ABSTRACT OF THE DISCLOSURE

A process controller having proportional, integral and reset actions wherein a memory element supplies part of the integral action. The controller uses an operational amplifier having a capacitor disposed in its feedback circuit. The memory element is adjusted in response to the capacitor to provide a long integral action for the controller.

---

Figure 1:
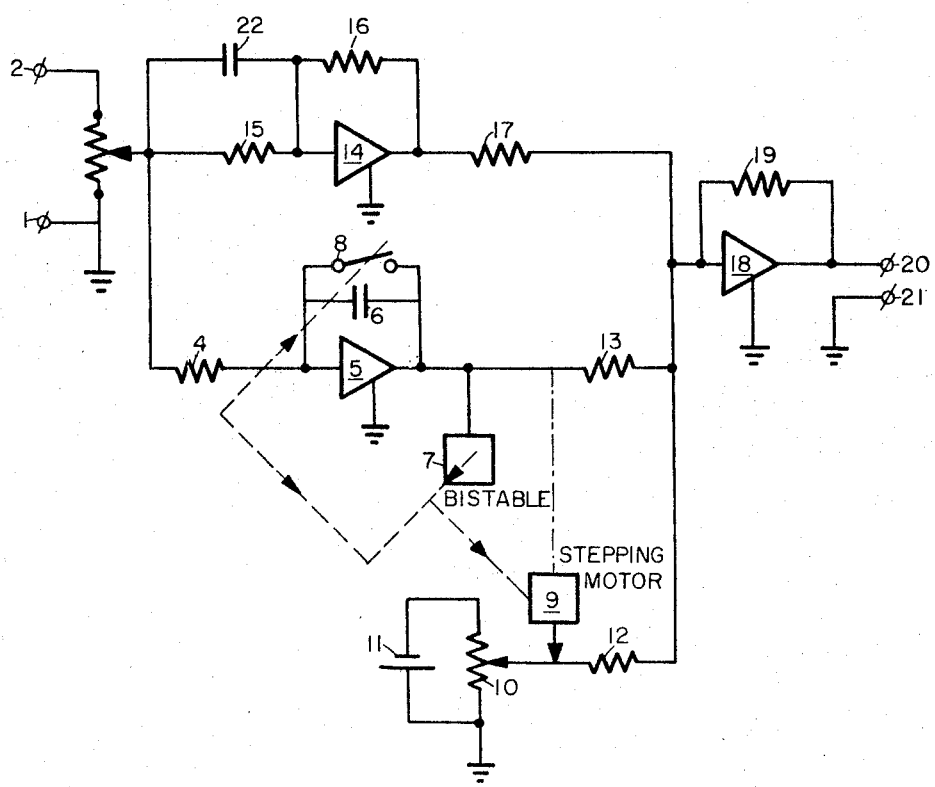

The invention provides an apparatus for the automatic control of a process condition wherein the measured value of the controlled condition is compared with a set value. An electric difference voltage corresponding to the difference between the measured and set values is obtained with the difference voltage being supplied to a controller having integral, proportional and differential action. If the measured difference is available in some form other than an electric signal, for instance a pneumatic signal, then it can be converted into an electric signal.

The output signal from the controller is available as an electric signal and may be used if necessary after amplification, for adjusting a device, such as a valve. If desired, the electric signal can be converted into a pneumatic signal by known means and used as the control signal. It is also possible for the output signal to affect the set value of a succeeding controller as in a cascade control.

The essential part of controllers of the type referred to above is formed by an operational amplifier with a feedback circuit. With an amplifier of this type the ratio between the output voltage and the input voltage is determined by the ratio between the impedance of the feedback element and the impedance in the input line. Integral action of the controller is obtained by providing a capacitor in the feedback circuit and slowly charging or discharging this capacitor through a suitable input impedance. The charge of the capacitor determines the output voltage, as a result of which the output voltage will likewise slowly change. The memory capacity of the integral action is thus formed by the charge of the capacitor and, hence, measures must be taken to prevent the charge of the capacitor from being lost by leakage.

According to this invention the output signal, at least part of it, is derived from a memory element that forms part of the integral action of the operational amplifier. The memory element is adjusted automatically and discontinuously to store a portion of the charge accumulated by the capacitor.

The memory of the integral action is formed by an element that is adjusted stepwise in response to the charge on the capacitor. This element is controlled by the associated operational amplifier whose output is fed back to its input through a capacitor. However, this amplifier only has to determine the progress from step to step, as the previous history of the integration process has been stored by the memory element taking up a new position. The storing can be done with great accuracy. For example, assume that the entire integral action is divided into 500 steps. Then the feedback capacitor of the operational amplifier only has to form the memory element for the integral action during the time between two successive steps, which on the average is only during one five hundredth part of the entire integral action time. The influence of possible leakage of charge of the feedback capacitor is now reduced.

In the case of a reversal of the sign of the difference voltage the advantages of the stepwise storing of the previous history of the integration process become apparent in the same way. The memory element will then start to move stepwise in the opposite direction with the same accuracy.

The advantages of an apparatus according to the invention become apparent particularly when it is necessary to use long integral action time in control circuits. This necessity occurs for instance in processes with a long response time for a control action or in control circuits where use is made of measuring equipment which supplies results discontinuously at long intervals, such as chromatographic analytical equipment. Also, in a control circuit where the controlled condition has a large influence on the measured value, it is preferable to set the proportional band of the controller to a large value. The proportional band is normally defined as the range which the input signal has to traverse to cause the output signal, in the case of proportional action, to change over its full range of action. The proportional band is expressed in percent of the range of action of the input signal, for instance, it may amount to 5000 percent. If one wants an integral action time of, for instance, 3 hours, the controller must act under conditions corresponding to an integral action time of 150 hours with a proportional band of 100 percent. Conventional controllers are not capable of meeting this requirement, but the apparatus according to the invention can do so without difficulty and with great accuracy.

A suitable embodiment of a controller according to the invention is formed by an operational amplifier whose output is fed back to its input through a capacitor. The capacitor can be charged by the difference voltage while the ouput of the amplifier is connected to an amplitude-sensitive element which triggers any time the voltage of the feedback capacitor reaches a specific value. The amplitude sensitive element discharges the capacitor and adjusts the memory element one step. The direction of that adjustment is dependent on the sign of the difference voltage and the process controlled by a signal derived from the position of the memory element.

The amplitude-sensitive element may be a gas discharge tube having a threshold value with the tube operating a relay or a bistable circuit may be used. The amplitude-sensitive element must be capable of responding to the positive or negative voltages as the feedback capacitor can be charged positively or negatively, depending on the sign of the difference voltage. It is possible to make use of two amplitude-sensitive elements, one of which is suitable for positive pulses, the other for negative pulses.

The sign of the difference voltage is related to the sign of the difference between measured and set value. If this sign is reversed, for instance, the value of a measured liquid flow becoming larger than the set value instead of smaller than that value, then the control action also has to be reversed. The sign of the control voltage will depend on the number of amplifying stages and the controlled device can be designed to accept the signal.

It is possible for the direction of the adjustment to be dependent on the output voltage of the amplifier whose output is fed back to its input through a capacitor. This output voltage generally follows the sign of the difference voltage, because the capacitor is correspondingly charged. If, however, the sign of the difference voltage reverses when the capacitor is partially charged, then this charge will first be neutralized by the difference voltage before the charging with reversed sign starts.

The feedback capacitor may be entirely discharged by coupling the capacitor to ground in response to operation of the amplitude-sensitive element. This may take place as a result of a momentary closure of a switch across that capacitor. It is also possible to effect a short circuit with a bistable circuit that effectively couples the capacitor to ground.

With an appropriate choice of the values of the capacitance and of the impedance between the input of the amplifier and the source of the difference voltage the frequency of the discharge of the capacitor may lie in the range of from 0–80 cycles per second, which has been found to be satisfactory.

Figure 2:
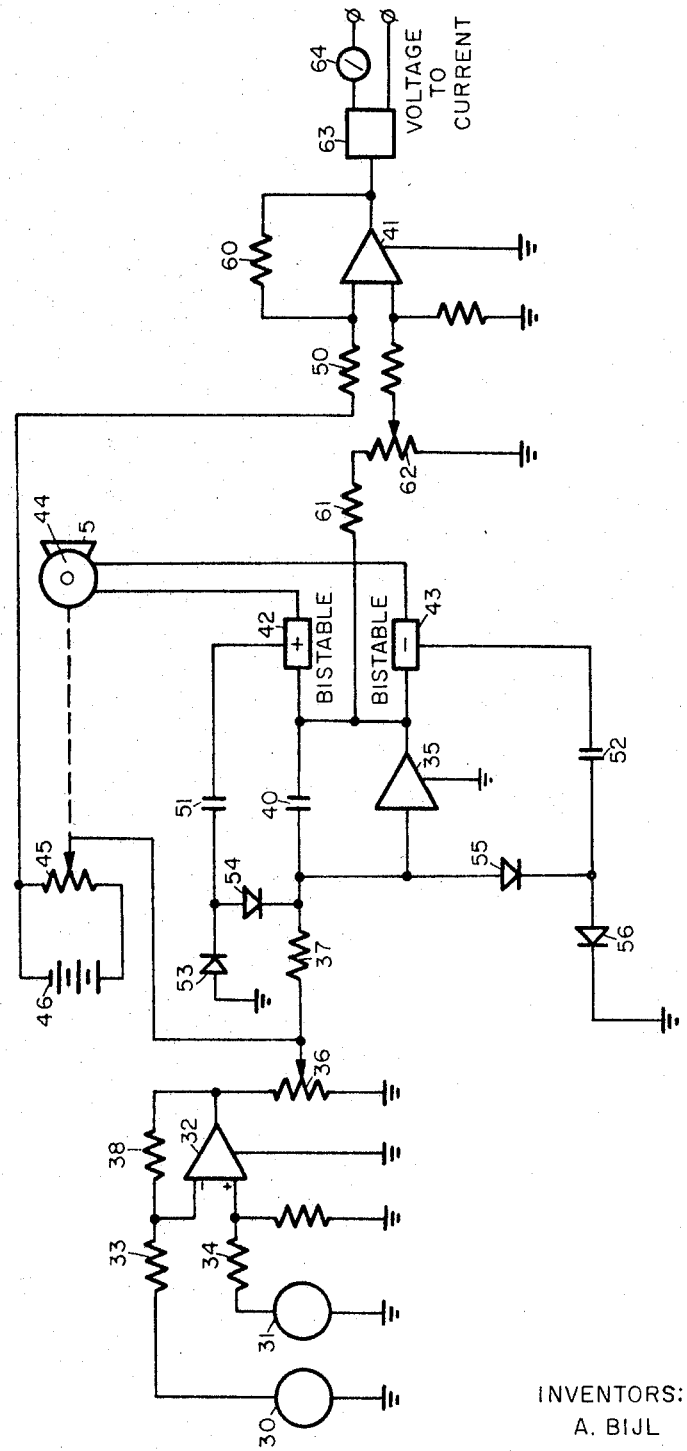

The invention will be more easily understood from the following detailed description of preferred embodiments when taken in conjunction with the attached drawings in which FIGURE 1 is a simplified schematic drawing of one embodiment; and FIGURE 2 is a schematic drawing of a complete control system.

Referring to FIGURE 1 the difference voltage can be obtained across a variable resistance 3 by applying the measured voltage to terminal 2 and the set voltage to terminal 1. The variable resistance 3 also serves as the gain-adjusting element of the circuit. The difference voltage is passed to the input of an operational amplifier 5 through resistor 4. The output of this amplifier is fed back to its input through a capacitor 6 with the resistor 4 serving as the charging resistor for the capacitor 6. The output of this amplifier is connected to the amplitude-sensitive element 7. Action of the amplitude-sensitive element 7 closes the switch 8 momentarily and moves the stepwise adjustable element 9 one position. As a result of this adjustment the wiper of potentiometer 10 also is moved a predetermined amount. The potentiometer 10 is connected to a direct-current voltage source 11 having a fixed or controlled voltage level.

The operation of the part of FIGURE 1 described so far is as follows. Capacitor 6 is charged through resistor 4 from the potentiometer 3, hence, by the difference voltage. Owing to the high negative gain of amplifier 5 and the feedback through capacitor 6 the input of amplifier 5 has a potential which is substantially zero. The current being supplied comparatively slowly via resistor 4 passes to capacitor 6 and the output voltage of amplifier 5 also increases comparatively slowly. When a preset threshold value is exceeded, the amplitude-sensitive element 7 triggers. As a result of this action switch 8 is momentarily closed, and the capacitor 6 is entirely discharged. Immediately after the discharging of capacitor 6 the switch 8 opens again. Also, the triggering of amplitude-sensitive element 7 causes the stepwise adjustable element 9 to be moved one step. The connections between the amplitude-sensitive element 7 and the switch 8 and adjustable element 9 are shown by the dashed lines. Thus, as long as a difference voltage of the same sign is present between the terminals 1 and 2 which is capable of charging capacitor 6 to a sufficiently large value, element 9 will be moved one step each time the level of capacitor 6 exceeds the threshold level of the amplitude-sensitive element 7. As a result, the voltage across the wiper of potentiometer 10 always changes in the same direction as the change in the difference voltage. This voltage may be used either alone or in combination with another voltage to position or control the process.

A controller has integral action if the rate at which the output signal changes is directly proportional to the input signal. The integral action time is the time required to obtain a specific change in the output signal after a specific change in the input signal. The charge of capacitor 6 changes at a rate directly proportional to the input signal, just like the output voltage of amplifier 5. This output voltage can thus represent the signal of a controller with integral action. However, as the wiper of potentiometer 10 is moved each time that a specific charge of capacitor 6 is reached, the voltage collected from potentiometer 10 forms, when plotted against the time, a stepwise voltage which is representative of the course which the voltage across capacitor 6 would follow if the charging should not be interrupted by switch 8. The output voltage of potentiometer 10 collected at a certain point of time represents the progress of the integral action. For an accurate determination hereof it is irrelevant whether this has been a long or a short time. Once a position of potentiometer 10 is reached this position fixes the history or memory of the integration process. The integral action time can be set by variation of the resistor 4 and/or of the capacitor 6.

The sense of movement of element 9 is determined by the polarity of the output voltage of amplifier 5, which in turn is determined by the polarity of the difference voltage.

If there is no difference voltage across the terminals 1 and 2, it is impossible for the capacitor 6 to be charged and potentiometer 10 will then not be adjusted.

If the output signal of the controller is formed only by the signal that is transmitted by resistor 12, then the controller has integral action only, with an output signal that changes stepwise. If the output signal consists of the sum of the currents through the resistances 12 and 13, then there can be obtained an output signal of a controller with integral action that follows a smooth course. The current through resistor 13 will follow a smooth or ramp curve during successive discharges and will be added to the stepwise changing current through the resistor 12.

FIGURE 1 in addition shows the circuit for proportional and derivative action of the controller. For this purpose a second operational amplifier 14 has been added and connected to potentiometer 3 by resistor 15. The output of amplifier 14 is fed back to its input via resistor 16. A capacitor 22 is also provided in the connection between resistor 3 and the input of amplifier 14. The capacitor 22 will be charged by the difference voltage and provide differential action for the controller. The output voltage of amplifier 14 is always proportional to and the differential of the input voltage, which is essential for proportional action to be obtained. This contribution can be added to the control signal by resistor 17.

The signals obtained by the resistors 12, 13, and 17 can be summed by means of a third operation amplifier 18 whose output is fed back to its input by a resistor 19. The voltages which are applied to the resistors 12, 13 and 17 give rise to currents through these resistors which are proportional to those voltages. Between the terminals 20 and 21 the output signal of the controller with proportional, differential and integral action can then be derived. In a similar way derivative action can be added, which is not further indicated.

It may be advantageous to use a stepping motor for the adjustable element 9 and couple its shaft to the potentiometer 10. The design or the mode of connection of the stepping motor may be such that when the sign of the current pulse reverses, the sense of rotation of the stepping motor also is reversed. The extent of the progress of the integral action corresponds to the position of the potentiometer. Usually one triggering of the amplitude-sensitive element will correspond to one stepwise change in the position of the potentiometer.

Suitable embodiments of the stepwise adjustable element may further consist of pawl-and-ratchet-wheel mechanisms where the pawls are electromagnetically opearted, or also, of electronic memory systems, such as a plurality of bistable circuits.

It is adavntageous for the output signal to consist of the sum of the signals derived from the discontinuously adjusting memory element and from the output voltage of the operational amplifier, mentioned hereinbefore, whose output is fed back to its input by a capacitor. The source of the difference voltage each time charges the capacitor again to the same value. Then the amplitude-sensitive element breaks down and the charge of the capacitor is reduced to zero or to a low value. The magnitude of the integral action then appears from the position of the stepwise adjustable element, for instance the stepping motor in combination with the potentiometer 10. The potentiometer 10 supplies a voltage that changes in discrete steps and, as a result, the correcting unit also will be adjusted in discrete steps. By adding a signal derived from the output voltage of the aforementioned opeartional amplifier to this discontinuous signal the difference in voltage between two steps is eliminated so that a voltage is obtained which is substantially a smooth continuous voltage.

A controller with more universal properties is obtained if the output signal in addition contains a signal derived from the output voltage of an operation amplifier with feedback capable of proportional and differential action. An amplifier of this type has an input impedance being of the same type as the feedback impedance. These two impedances are mostly resistances or capacitances and a controller with proportional, differential and integral action is obtained.

Referring now to FIGURE 2 there is shown a complete circuit for a controller constructed according to this invention. The circuit shown in FIGURE 2, in addition to providing a long memory or integration time, also provides proportional and differential action for the controller. The set point is supplied as an electrical signal at terminal 30, while the measured value is supplied as a similar electrical signal at terminal 31. The measured value may be the pressure, tempearture, or any other variable of the process, providing it is converted to an analog electrical signal. The set point and measured value signals are supplied to the plus and minus terminals of an operational amplifier 32 that is provided with a resistance 38 in its feedback circuit. Thus, the operational amplifier 32 will operate as a summing amplifier and provide an output equal to the difference between the two input signals. The resistances 33 and 34 are provided in the input leads of the set point and measured value signals to adjust the magnitude of the two signals and balance the system.

The output from the amplifier 32 is supplied as an input to the operational amplifier 35 through a gain-adjusting resistor 36. The input to the operational amplifier 35 will normally have a zero value and the system will operate to turn this point to zero when the value varies. A resistor 37 is provided in the input circuit of the operational amplifier 35 and operates as a charging resistor for the integrating capacitor 40. The integrating capacitor 40 is, of course, disposed in a feedback circuit of the operational amplifier 35 to convert the operational amplifier to an integrating circuit. The output from the operational amplifier 35 is supplied both to a summing amplifier 41 described below and to two amplitude-sensitive circuits 42 and 43. These circuits may be polarized relays whose sensitivity is adjusted to the desired values or may be bistable circuits. Further the circuit 42 is adjusted so that it will trigger or indicate the point at which the output from the operational amplifier 35 exceeds a positive threshold level. Similarly, the circuit 43 will indicate whenever the output from the operational amplifier 35 falls below a negative threshold level. The two amplitude-sensitive circuits 42 and 43 are coupled to a stepping device 44. Stepping device 44 may be a stepping motor that advances a fixed amount upon the application of each pulse from the circuits 42 and 43. The direction of rotation of the stepping motor 44 is controlled by the circuits 42 and 43 to advance in one direction in response to one circuit and in the opposite direction in response to the other circuit. Stepping motor 44 is coupled to the variable resistance or potentiometer 45 and steps the potentiometer a discrete amount in response to each pulse from the circuits 42 and 43. The variable resistance 45 is powered from a power supply 46 which may be a battery and is preferably a constant voltage power supply. The potentiometer 45 is also coupled to the opeartional amplifier 41 by a resistance 50.

The proportional action of the circuit is provided by a connection between the resistance 36 and the resistance 45. Thus, whenever an error signal appears at the resistance 36, it will be added to the long memory portion of the integral action supplied by the resistance 45. Since the control is normally designed to operate with a zero error signal at 36 there will normally be no proportional signals supplied to 45.

The differential action is supplied by means of capacitors 51 and 52 in combination with diodes 53, 54, 55 and 56. The amplitude-sensitive circuits 42 and 43 supply a pulse to charge capacitors 51 and 52, respectively. Thus, when the amplitude-sensitive circuits reach either the positive or negative threshold level and trigger, they will supply a pulse to charge the capacitors 51 and 52. The charge on the capacitors 51 and 52 will be combined with the error signal at the input to the operational amplifier 35.

The signals from the integral, proportional and differential action of the controller are summed in the amplifier 41. The amplifier 41 is provided with a resistance 60 in its feedback circuit in order that it may operate as a summing device. In addition, that portion of the integral action supplied by the operational amplifier 35 will be supplied through the resistance 61 and gain-adjusting resistor 62 to the opposite terminal of the amplifier 41. Thus, the amplifier 41 will sum both the step voltages as supplied by the resistance 45 plus the continuously increasing voltage supplied by the operational amplifier 35. The output from the summing amplifier 41 will be supplied to a voltage-to-current converter 63 whose output can be observed on a meter 64 and used as a control signal for a valve or similar device.

We claim as our invention:

1. An automatic process controller wherein the measured value signal of the controlled condition is compared with a set value signal and the difference between the signals used to effect the control of the process, said controller comprising:

an operational amplifier having a feedback circuit including a capacitor disposed therein, the difference signal being coupled to the input of said operational amplifier;

an amplitude-sensitive circuit, said amplitude-sensitive circuit being coupled to the output of said operational amplifier, said amplitude-sensitive circuit in addition responding to both positive and negative voltages that exceed a threshold value;

a stepwise adjustable element, said adjustable element being coupled to sensitive element to move said adjustable element one step whenever the threshold level of said sensitive element is exceeded, the direction of said movement being dependent on the polarity of the voltage from said operational amplifier;

a summing amplifier, both said operational amplifier and said adustable element being coupled to said summing amplifier, the output signal of said summing amplifier being used to control the measured value.

2. The controller of claim 1 wherein said adjustable element comprises a stepping motor coupled to a potentiometer, the potentiometer and operational amplifier being coupled to said summing amplifier.

3. The controller of claim 1 wherein said difference signal is coupled to a second operational amplifier having a resistance disposed in its feedback circuit to provide a proportional action, the output of said second operational amplifier being coupled to said summing amplifier.

References Cited

UNITED STATES PATENTS

| | | | |
|---|---|---|---|
| 2,656,498 | 10/1953 | Goodwin | 330—9 X |
| 3,355,644 | 11/1967 | Goslin et al. | 318—138 |

NATHAN KAUFMAN, *Primary Examiner.*

U.S. Cl. X.R.

318—138; 328—127, 143, 158; 330—51